US012769537B2

(12) United States Patent
Huo et al.

(10) Patent No.: US 12,769,537 B2
(45) Date of Patent: Oct. 20, 2026

(54) MANAGING CONTAINER IMAGES

(71) Applicant: International Business Machines Corporation, Armonk, NY (US)

(72) Inventors: Qi Feng Huo, Beijing (CN); Da Li Liu, Beijing (CN); Yuan Yuan Wang, Beijing (CN); Yan Song Liu, Beijing (CN); Lei Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 18/757,889

(22) Filed: Jun. 28, 2024

(65) Prior Publication Data

US 2026/0003598 A1 Jan. 1, 2026

(51) Int. Cl.
*G06F 8/65* (2018.01)

(52) U.S. Cl.
CPC .................................... *G06F 8/65* (2013.01)

(58) Field of Classification Search
None
See application file for complete search history.

(56) References Cited

U.S. PATENT DOCUMENTS

| | | | | |
|---|---|---|---|---|
| 8,260,750 | B1 * | 9/2012 | Gugick | G06F 11/1461 707/645 |
| 10,002,247 | B2 | 6/2018 | Suarez et al. | |
| 10,169,209 | B2 * | 1/2019 | McPherson | G06F 11/3636 |
| 10,379,841 | B2 | 8/2019 | Wong et al. | |
| 10,528,337 | B1 | 1/2020 | Varadharajan Kannan | |
| 11,249,745 | B2 | 2/2022 | Cheng et al. | |
| 2017/0177860 | A1 * | 6/2017 | Suarez | G06F 21/53 |
| 2018/0088926 | A1 | 3/2018 | Abrams | |
| 2020/0218529 | A1 * | 7/2020 | Cheng | G06F 8/65 |
| 2020/0272427 | A1 | 8/2020 | Wang et al. | |
| 2023/0325080 | A1 * | 10/2023 | Huo | G06F 3/0607 |
| 2024/0004631 | A1 | 1/2024 | Nelson et al. | |

* cited by examiner

*Primary Examiner* — S. Sough
*Assistant Examiner* — Joshua Tran
(74) *Attorney, Agent, or Firm* — Yee & Associates, P.C.

(57) ABSTRACT

Managing container images is provided. A number of a set of changed files included in a plurality of upgraded files is determined in response to identifying the set of changed files. It is determined whether the number of the set of changed files included in the plurality of upgraded files is greater than a defined file change threshold level. In response to determining that the number of the set of changed files included in the plurality of upgraded files is not greater than the defined file change threshold level, a new increment file layer that is in addition to an original file layer of a plurality of original layers is generated in an upgraded container image of an original container image. The set of changed files is copied in the new increment file layer of the upgraded container image.

18 Claims, 8 Drawing Sheets

MANAGING CONTAINER IMAGES

BACKGROUND

The disclosure relates generally to container images and more specifically to managing container images.

A container image is a standardized package that includes all of the files, binaries, libraries, and configurations to run a container. Containers allow developers to package applications into a single, portable unit, making it easy to deploy and run the applications on any system that supports container technology, such as Kubernetes® (a registered trademark of The Linux Foundation of San Francisco, California, USA) or the like. A container image is composed of layers. The layers encourage reuse of various components, so that a user does not create everything from scratch for each project. For example, the user can utilize the original container image as a base image to create upgraded or newer versions of the container image. The user utilizes unique identifiers to identify the different versions of the container image. Typically, the user stores the container images in a registry.

The container images can, for example, comply with the Open Container Initiative® (a registered trademark of The Linus Foundation, San Francisco, California, USA). The Open Container Initiative (OCI) is open industry standards regarding container formats and runtime. The OCI contains three specifications: 1) a runtime specification; 2) an image specification; and 3) a distribution specification. The runtime specification defines how a container runs on a supported container-based environment, platform, or architecture. The image specification defines the physical structure of the container. The distribution specification defines the Application Programming Interface (API) protocol by which the container is sent and received. Together, these specifications provide a comprehensive framework for building, sharing, and running containers, and ensure the portability and interoperability of containerized applications across different container-based environments, platforms, or architectures.

SUMMARY

According to one illustrative embodiment, a computer-implemented method for managing container images is provided. A computer determines a number of a set of changed files included in a plurality of upgraded files in response to identifying the set of changed files. The computer determines whether the number of the set of changed files included in the plurality of upgraded files is greater than a defined file change threshold level. In response to the computer determining that the number of the set of changed files included in the plurality of upgraded files is not greater than the defined file change threshold level, the computer generates a new increment file layer that is in addition to an original file layer of a plurality of original layers in an upgraded container image of an original container image. The computer copies the set of changed files in the new increment file layer of the upgraded container image. According to other illustrative embodiments, a computer system and computer program product for managing container images are provided.

DETAILED DESCRIPTION

Figure 1:
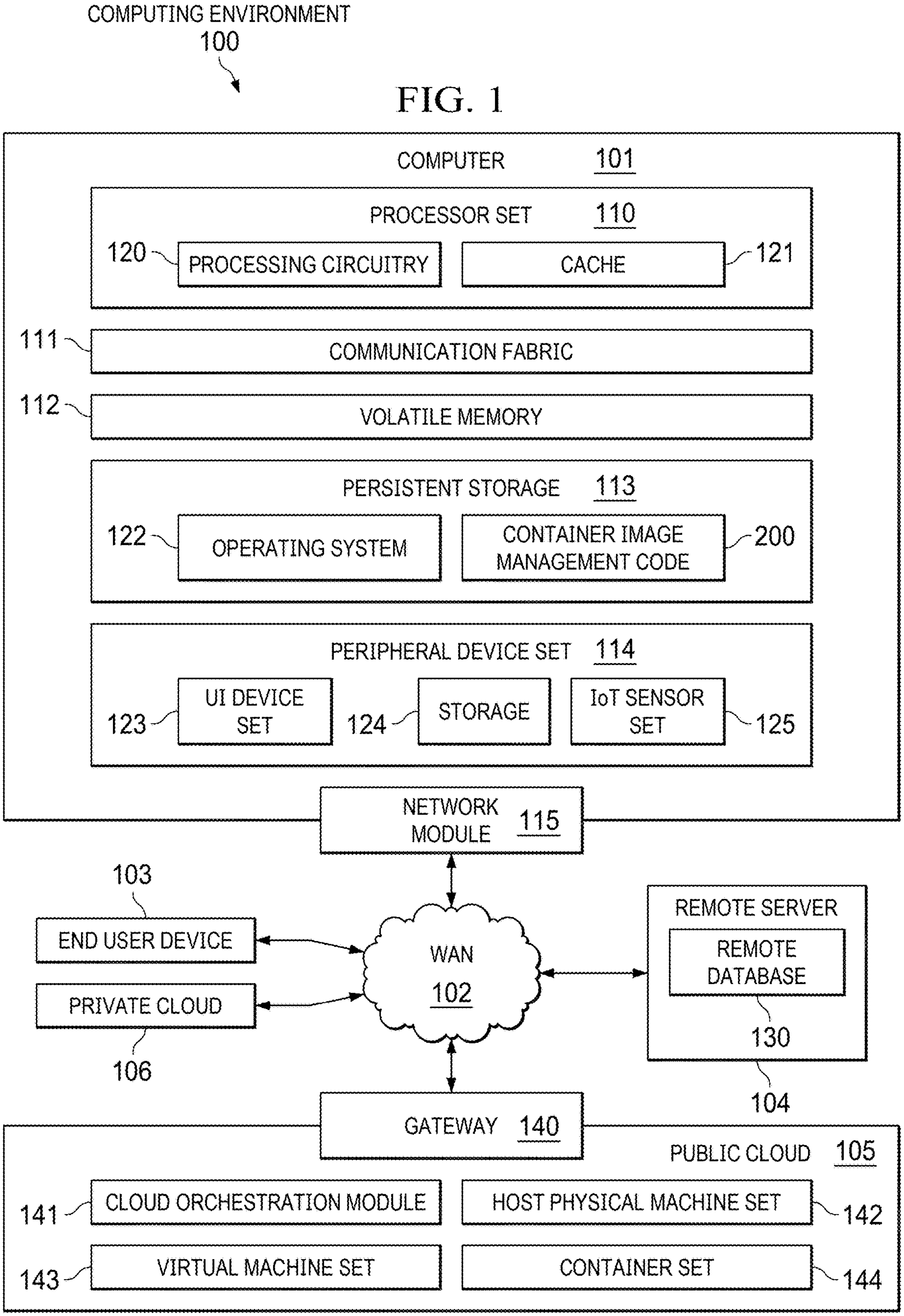
FIG. 1 is a pictorial representation of a computing environment in which illustrative embodiments may be implemented.

A computer-implemented method provides managing container images. A computer determines a number of a set of changed files included in a plurality of upgraded files in response to identifying the set of changed files. The computer determines whether the number of the set of changed files included in the plurality of upgraded files is greater than a defined file change threshold level. In response to the computer determining that the number of the set of changed files included in the plurality of upgraded files is not greater than the defined file change threshold level, the computer generates a new increment file layer that is in addition to an original file layer of a plurality of original layers in an upgraded container image of an original container image. The computer copies the set of changed files in the new increment file layer of the upgraded container image. As a result, illustrative embodiments provide a technical effect of only copying changed files into an upgraded container image, thereby decreasing microservice unavailability during container image upgrade.

Also, in response to the computer determining that the number of the set of changed files included in the plurality of upgraded files is greater than the defined file change threshold level, the computer generates a new anchor file layer that replaces the original file layer of the plurality of original layers in the upgraded container image of the original container image. The computer copies the set of changed files and a plurality of original files in the new anchor file layer of the upgraded container image. As a result, illustrative embodiments provide a technical effect of saving time when pulling a container image to upgrade from an original version to the new upgraded version by reusing unchanged container image layers and only pulling the new anchor file layer.

In addition, the computer performs a comparison of a first hash of a plurality of original files in the original file layer of the original container image and a second hash of the plurality of upgraded files corresponding to the upgraded container image. The computer identifies the set of changed files included in the plurality of upgraded files based on the comparison of the first hash of the plurality of original files in the original file layer of the original container image and the second hash of the plurality of upgraded files corresponding to the upgraded container image. As a result, illustrative embodiments provide a technical effect of only identifying the set of changed files based on comparing the hash of the original files and the hash of the upgraded files.

Further, the computer generates a first hash of a plurality of original files in the original file layer of the original container image and the computer generates a second hash of the plurality of upgraded files corresponding to the upgraded container image. As a result, illustrative embodiments provide a technical effect of generating a hash of the original files and a hash of the upgraded files for comparison to quickly determine whether a difference exists between the two sets of files.

Furthermore, the computer stops a microservice in response to receiving an input to upgrade the original container image to a new version of the original container image. The computer determines an identifier corresponding to the new version of the original container image. The computer performs a search of a remote image registry to locate the identifier corresponding to the new version of the original container image. The computer determines whether the identifier corresponding to the new version of the original container image is associated with the new increment file layer that contains the set of changed files based on the search of the remote image registry. As a result, illustrative embodiments provide a technical effect of searching a remote image registry for only the new increment file layer that contains the set of changed associated with the new version of the original container image.

Moreover, in response to the computer determining that the identifier corresponding to the new version of the original container image is associated with the new increment file layer that contains the set of changed files based on the search of the remote image registry, the computer retrieves only the new increment file layer that contains the set of changed files from the remote image registry using the identifier. The computer adds the new increment file layer containing the set of changed files retrieved from the remote image registry to the plurality of original layers that includes the original file layer to form the new version of the original container image. As a result, illustrative embodiments provide a technical effect of decreasing microservice unavailability during container image upgrade by only retrieving the new increment file layer that contains the set of changed files from the remote image registry and adding the new increment file layer that contains the set of changed files to the original layers to form the new version of the original container image.

Further, in response to the computer determining that the identifier corresponding to the new version of the original container image is not associated with a new increment file layer that contains the set of changed files based on the search of the remote image registry, the computer determines that the identifier corresponding to the new version of the original container image is associated with a new anchor file layer. The computer retrieves only the new anchor file layer that contains the set of changed files and a plurality of original files from the remote image registry using the identifier. The computer replaces the original file layer of the plurality of original layers with the new anchor file layer that contains the set of changed files and the plurality of original files retrieved from the remote image registry to form the new version of the original container image. As a result, illustrative embodiments provide a technical effect of decreasing microservice unavailability during container image upgrade by only retrieving the new anchor file layer that contains the set of changed files and the original files from the remote image registry and replacing the original file layer with the new anchor file layer to form the new version of the original container image.

In addition, the computer generates a container to run the microservice based on the new version of the original container image. The computer runs the microservice using the container that was generated based on the new version of the original container image. As a result, illustrative embodiments provide a technical effect of running the microservice using the container that was generated based on the new version of the original container image, thereby decreasing the upgrade time and unavailability of the microservice.

A computer system for managing container images comprises a communication fabric, a set of computer-readable storage media connected to the communication fabric, where the set of computer-readable storage media collectively stores program instructions, and a set of processors connected to the communication fabric, where the set of processors executes the program instructions. The computer system determines a number of a set of changed files included in a plurality of upgraded files in response to identifying the set of changed files. The computer system determines whether the number of the set of changed files included in the plurality of upgraded files is greater than a defined file change threshold level. The computer system generates a new increment file layer that is in addition to an original file layer of a plurality of original layers in an upgraded container image of an original container image in response to the computer system determining that the number of the set of changed files included in the plurality of upgraded files is not greater than the defined file change threshold level. The computer system copies the set of changed files in the new increment file layer of the upgraded container image. As a result, illustrative embodiments provide a technical effect of only copying changed files into an upgraded container image, thereby decreasing microservice unavailability during container image upgrade.

Also, the computer system generates a new anchor file layer that replaces the original file layer of the plurality of original layers in the upgraded container image of the original container image in response to the computer system determining that the number of the set of changed files included in the plurality of upgraded files is greater than the defined file change threshold level. The computer system copies the set of changed files and a plurality of original files in the new anchor file layer of the upgraded container image. As a result, illustrative embodiments provide a technical effect of saving time when pulling a container image to upgrade from an original version to the new upgraded version by reusing unchanged container image layers and only pulling the new anchor file layer.

In addition, the computer system performs a comparison of a first hash of a plurality of original files in the original file layer of the original container image and a second hash of the plurality of upgraded files corresponding to the upgraded container image. The computer system identifies the set of changed files included in the plurality of upgraded files based on the comparison of the first hash of the plurality of original files in the original file layer of the original container image and the second hash of the plurality of upgraded files corresponding to the upgraded container image. As a result, illustrative embodiments provide a technical effect of only identifying the set of changed files based on comparing the hash of the original files and the hash of the upgraded files.

Further, the computer system generates a first hash of a plurality of original files in the original file layer of the original container image and the computer system generates a second hash of the plurality of upgraded files corresponding to the upgraded container image. As a result, illustrative embodiments provide a technical effect of generating a hash of the original files and a hash of the upgraded files for comparison to quickly determine whether a difference exists between the two sets of files.

A computer program product for managing container images comprises a set of computer-readable storage media having program instructions collectively stored therein, the program instructions executable by a computer. The computer determines whether the number of the set of changed files included in the plurality of upgraded files is greater than a defined file change threshold level. In response to the computer determining that the number of the set of changed files included in the plurality of upgraded files is not greater than the defined file change threshold level, the computer generates a new increment file layer that is in addition to an original file layer of a plurality of original layers in an upgraded container image of an original container image. The computer copies the set of changed files in the new increment file layer of the upgraded container image. As a result, illustrative embodiments provide a technical effect of only copying changed files into an upgraded container image, thereby decreasing microservice unavailability during container image upgrade.

Also, in response to the computer determining that the number of the set of changed files included in the plurality of upgraded files is greater than the defined file change threshold level, the computer generates a new anchor file layer that replaces the original file layer of the plurality of original layers in the upgraded container image of the original container image. The computer copies the set of changed files and a plurality of original files in the new anchor file layer of the upgraded container image. As a result, illustrative embodiments provide a technical effect of saving time when pulling a container image to upgrade from an original version to the new upgraded version by reusing unchanged container image layers and only pulling the new anchor file layer.

In addition, the computer performs a comparison of a first hash of a plurality of original files in the original file layer of the original container image and a second hash of the plurality of upgraded files corresponding to the upgraded container image. The computer identifies the set of changed files included in the plurality of upgraded files based on the comparison of the first hash of the plurality of original files in the original file layer of the original container image and the second hash of the plurality of upgraded files corresponding to the upgraded container image. As a result, illustrative embodiments provide a technical effect of only identifying the set of changed files based on comparing the hash of the original files and the hash of the upgraded files.

Further, the computer generates a first hash of a plurality of original files in the original file layer of the original container image and the computer generates a second hash of the plurality of upgraded files corresponding to the upgraded container image. As a result, illustrative embodiments provide a technical effect of generating a hash of the original files and a hash of the upgraded files for comparison to quickly determine whether a difference exists between the two sets of files.

Furthermore, the computer stops a microservice in response to receiving an input to upgrade the original container image to a new version of the original container image. The computer determines an identifier corresponding to the new version of the original container image. The computer performs a search of a remote image registry to locate the identifier corresponding to the new version of the original container image. The computer determines whether the identifier corresponding to the new version of the original container image is associated with the new increment file layer that contains the set of changed files based on the search of the remote image registry. As a result, illustrative embodiments provide a technical effect of searching a remote image registry for only the new increment file layer that contains the set of changed associated with the new version of the original container image.

Moreover, in response to the computer determining that the identifier corresponding to the new version of the original container image is associated with the new increment file layer that contains the set of changed files based on the search of the remote image registry, the computer retrieves only the new increment file layer that contains the set of changed files from the remote image registry using the identifier. The computer adds the new increment file layer containing the set of changed files retrieved from the remote image registry to the plurality of original layers that includes the original file layer to form the new version of the original container image. As a result, illustrative embodiments provide a technical effect of decreasing microservice unavailability during container image upgrade by only retrieving the new increment file layer that contains the set of changed files from the remote image registry and adding the new increment file layer that contains the set of changed files to the original layers to form the new version of the original container image.

Further, in response to the computer determining that the identifier corresponding to the new version of the original container image is not associated with a new increment file layer that contains the set of changed files based on the search of the remote image registry, the computer determines that the identifier corresponding to the new version of the original container image is associated with a new anchor file layer. The computer retrieves only the new anchor file layer that contains the set of changed files and a plurality of original files from the remote image registry using the identifier. The computer replaces the original file layer of the plurality of original layers with the new anchor file layer that contains the set of changed files and the plurality of original files retrieved from the remote image registry to form the new version of the original container image. As a result, illustrative embodiments provide a technical effect of decreasing microservice unavailability during container image upgrade by only retrieving the new anchor file layer that contains the set of changed files and the original files from the remote image registry and replacing the original file layer with the new anchor file layer to form the new version of the original container image.

In addition, the computer generates a container to run the microservice based on the new version of the original container image. The computer runs the microservice using the container that was generated based on the new version of the original container image. As a result, illustrative embodiments provide a technical effect of running the microservice using the container that was generated based on the new version of the original container image, thereby decreasing the upgrade time and unavailability of the microservice.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
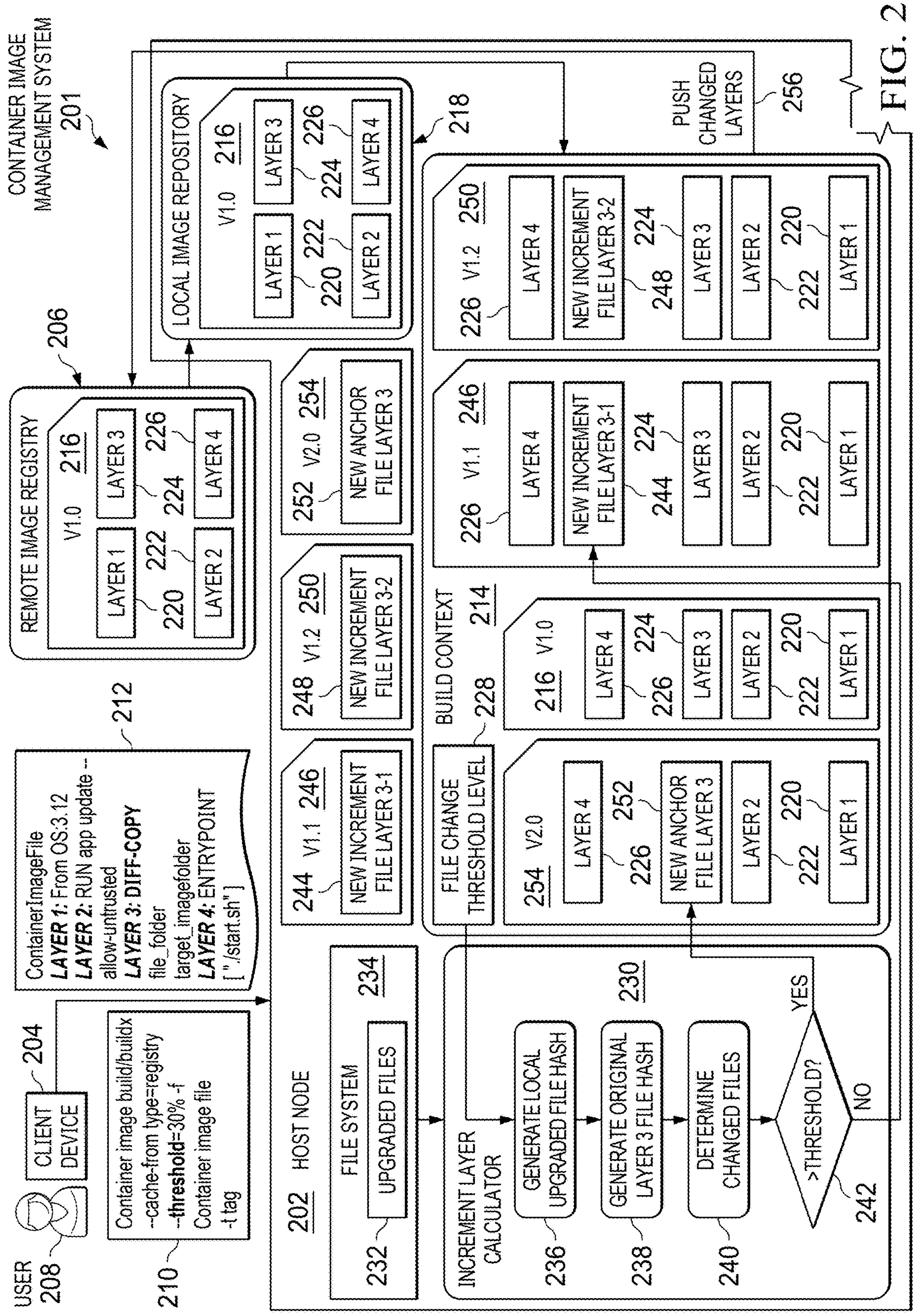
FIG. 2 is a diagram illustrating an example of a container image management system in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of a container-based environment, architecture, or platform, such as Kubernetes or the like, for the execution of at least some of the computer code involved in performing the inventive methods of illustrative embodiments, such as container image management code 200. For example, container image management code 200 generates a new increment file layer in a container image to save any changes to files in a file layer of the container image when building an upgraded or newer version of the container image, which, for example, complies with the OCI standards. For example, container image management code 200 improves efficiency by only copying certain files of a large number of files in the file layer of the container image. When building the upgraded version of the container image, container image management code 200 keeps the original file layer, determines the changed files from the original file layer, and copies the changed files in the new increment file layer of the container image. Thus, when upgrading the container image to a newer version during runtime, container image management code 200 only pulls the new increment file layer, which is a subset of the original file layer, making the container image upgrade process more efficient (i.e., needing less time for the upgrade, which decreases microservice downtime).

In addition to container image management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and container image management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in container image management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a developer, system administrator, or the like who utilizes the container image management services provided by computer 101), and may take any of the forms discussed above in connection with computer 101. EUD 103 typically receives helpful and useful data from the operations of computer 101. For example, in a hypothetical case where computer 101 is designed to provide a container image upgrade recommendation to the end user, this recommendation would typically be communicated from network module 115 of computer 101 through WAN 102 to EUD 103. In this way, EUD 103 can display, or otherwise present, the container image upgrade recommendation to the end user. In some embodiments, EUD 103 may be a client device, such as a thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a container image upgrade recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

When building a container image, such as an OCI container image, Docker® container image, or the like, it is common to use a COPY command to copy files or directories from the build context to the container image. Docker is a registered trademark of Docker, Inc., San Francisco, California, USA. Currently, if a large number of files (e.g., greater than 300 or more files) exists in a file layer of a container image and if only one of these files changes due to an upgrade, then a copy of all the files in the file layer containing that changed file needs to be made. As a result, currently when generating a new version of that container image, the entire file layer containing the changed file needs to be pulled.

Consequently, performance of pulling the new version of the container image in such a case currently is low because pull time is increased. For example, the container image builder copies all the files in the file layer of the container image again, causing the container image builder to take more time to pull the container image when upgrading the deployment of the original version of the container image to the upgraded version of the container image.

As an illustrative example, building a bootstrap container image can require copying a playbook folder. Typically, the playbook folder is expressed in a YAML format. The playbook folder is composed of a plurality of plays (i.e., files) in an ordered list. Each file runs one or more tasks to perform a portion of the overall goal of the playbook folder. The playbook folder of the bootstrap container image can, for example, contain over 1600 files. However, every time a new version of the bootstrap container image is built, the entire playbook folder currently needs to be copied again, increasing time needed for the copying process. In addition, to pull the new version of the bootstrap container image, the entire layer containing the playbook folder needs to be downloaded as well. However, in this illustrative example the bootstrap container image is upgraded once every two weeks, which only involves changing a relatively small number of files (e.g., 12 out of the entire 1600 files) within the playbook folder. Consequently, copying all 1600 files again for changes to only 12 files is inefficient.

Illustrative embodiments improve efficiency of copying files in a file layer of a container image. For example, when building a new upgraded version of a container image, illustrative embodiments keep the original file layer of the container image, determine the changed files from the original file layer, and copy only the changed files in a new increment file layer in the container image. When illustrative embodiments pull the container image during runtime, illustrative embodiments assemble or merge the original file layer and the new increment file layer together in the new upgraded version of the container image. Illustrative embodiments store any subsequent file changes (e.g., file upgrades) to the local file system of the host node separately without affecting the original copy of the original file layer in the original container image. Thus, illustrative embodiments can reuse the original container image containing a large number of original files instead of pulling all the files. Furthermore, illustrative embodiments can utilize a file change threshold level to determine when to generate a new anchor file layer of a container image when the number of files that were changed exceeds the file change threshold level (e.g., 25%, 30%, 35%, 40%, 45%, 50%, or the like). A user, such as a developer, sets the file change threshold level.

As a result, illustrative embodiments improve file copy efficiency in the container image build process by utilizing a new container image build command (e.g., Diff-Copy), which only copies changed files in a file layer when the number of changed files does not exceed the file change threshold level or copies all files, which includes the changed files and all the original files in the file layer, when the number of changed files exceeds the file change threshold level. Illustrative embodiments determine the number of changed files to be included in the new increment file layer by comparing generated hashes of the files. Moreover, illustrative embodiments utilize the file change threshold level to determine when to generate a new anchor file layer or a new increment file layer in the container image to form the new upgraded version of the container image.

As an illustrative example, assume that an original container image is original container image version V1.0. Original container image version V1.0 includes, for example, 4 layers. In this illustrative example, layer 1 is an operating system layer, layer 2 is an operation layer, layer 3 is a file layer, and layer 4 is a command layer. However, it should be noted that original container image version V1.0 can include any number and types of layers.

In this illustrative example, a developer wants to build new upgraded container image version V1.1. In response to receiving a build command or an input to build new upgraded container image version V1.1 from the developer, illustrative embodiments pull original container image version V1.0 from a local image repository of the host node. If illustrative embodiments cannot find original container image version V1.0 in the local image repository of the host node, then illustrative embodiments pull original container image version V1.0 from a remote image registry located, for example, on a remote server. Afterward, illustrative embodiments generate a hash of the original files in the original file layer (i.e., layer 3 in this example) of original container image version V1.0. In addition, illustrative embodiments generate a hash of new upgraded files located in the file system of the host node. The new upgraded files correspond to the original files in the original file layer of original container image version V1.0, but include a set of changes files.

Afterward, illustrative embodiments compare the hash of the original files in the original file layer of original container image version V1.0 with the hash of the new upgraded files located in the file system of the host node. Illustrative embodiments identify which files comprise the set of changed files based on the comparison of the two hashes. Furthermore, illustrative embodiments determine the number of the set of changed files based on identifying the set of changed files. If the number of the changed files is less than the file change threshold level, which the user set, then illustrative embodiments copy the changed files into a new increment file layer of new upgraded container image version V1.1. If the number of changed files is greater than or equal to the file change threshold level, then illustrative embodiments copy all files (i.e., upgraded files and original files) in a new anchor file layer of new upgraded container image version V1.1.

Illustrative embodiments push only the new increment file layer or the new anchor file layer to the remote image registry for future reference. When upgrading a host node from original container image version V1.0 to new upgraded container image version V1.1 during runtime, it should be noted that original container image version V1.0 already exists on the host node. In other words, layer 1, layer 2, layer 3, and layer 4 are not changed in original container image version V1.0. Illustrative embodiments only need to pull the new increment file layer (e.g., new increment file layer 3-1) or the new anchor file layer (e.g., new anchor file layer 3) from the remote image registry and merge the new file layer with the original layers cached locally in the local image repository of the host node.

As a result, illustrative embodiments are more efficient when upgrading a container image having a large number of files in the file layer of the container image. For example, illustrative embodiments save time when pulling the container image to upgrade from the original version to a new upgraded version by reusing the unchanged container image layers and only pulling the new increment file layer or the new anchor file layer. Consequently, illustrative embodiments decrease microservice unavailability during container image upgrade at runtime. In other words, illustrative embodiments decrease the upgrade time of microservices. For example, illustrative embodiment can decrease the upgrade time from several hours to several minutes. It should be noted that illustrative embodiments are compatible with existing OCI standards.

Thus, illustrative embodiments provide one or more technical solutions that overcome a technical problem with a current inability to only copy changed files to build and upgrade container images. As a result, these one or more technical solutions provide a technical effect and practical application in the field of container-based environments.

With reference now to FIG. 2, a diagram illustrating an example of a container image management system is depicted in accordance with an illustrative embodiment. Container image management system 201 may be implemented in a computing environment, such as computing environment 100 in FIG. 1. Container image management system 201 is a system of hardware and software components for building and upgrading container images on host nodes during microservice runtime.

In this example, container image management system 201 includes host node 202, client device 204, and remote image registry 206. Host node 202 can be, for example, computer 101 in FIG. 1. Client device 204 can be, for example, EUD 103 in FIG. 1. Remote image registry 206 can be, for example, remote database 130 located in remote server 104 in FIG. 1. However, it should be noted that container image management system 201 is intended as an example only and not as a limitation on illustrative embodiments. For example, container image management system 201 can include any number of host nodes, client devices, remote image registries, and other devices and components not shown.

In this example, user 208 utilizes client device 204 to send build command 210 and container image file 212 to host node 202 to build an upgraded version of original container image version V1.0 216. In response to host node 202 receiving build command 210, build context 214 pulls or retrieves original container image version V1.0 216 from local image repository 218. Build context 214 refers to the files and directories that are available during the image build process. In other words, build context 214 refers to the files and directories that the image build process can access. When using build command 210 to generate a container image from container image file 212, user 208 specifies the context that determines which files are available during the image build process.

In the event that original container image version V1.0 216 does not exist in local image repository 218, build context 214 pulls original container image version V1.0 216 from remote image registry 206. In this example, original container image version V1.0 216 includes original layer 1 220, original layer 2 222, original layer 3 224, and original layer 4 226. It should be noted that in this example original layer 3 224 is a file layer containing a plurality of original files (e.g., more than 300 files). Also, it should be noted that original container image version V1.0 216 is intended as an example only and can include more or fewer layers than shown.

Build context 214 includes file change threshold level 228, which in this example is 30% set by user 208 in build command 210. In response to build context 214 retrieving original container image version V1.0 216, increment layer calculator 230 retrieves file change threshold level 228 from build context 214 and retrieves upgraded files 232 from file system 234. Upgraded files 232 correspond to the plurality of original files in original layer 3 224 and include a set of changed files that upgrade one or more files of the plurality of original files.

At 236, increment layer calculator 230 generates a hash of upgraded files 232 retrieved from file system 234 of host node 202. At 238, increment layer calculator 230 generates a hash of the plurality of original files in original layer 3 224. It should be noted that increment layer calculator 230 can utilize any type of hashing algorithm (e.g., MD5, SHA-256, or the like) to generate the hashes. At 240, increment layer calculator 230 determines the set of changed files by comparing the hash of upgraded files 232 with the hash of the plurality of original files in original layer 3 224. In addition to determining the set of changed files, increment layer calculator 230 determines the number of the set of changed files (i.e., how many files exist in the set of changed files).

At 242, increment layer calculator 230 determines whether the number of the changed set of files is greater than or equal to file change threshold level 228, which in this example is 30%. In other words, increment layer calculator 230 determines if 30% or more of the plurality of original files in original layer 3 224 have been changed or not by upgraded files 232. If, at 242, increment layer calculator 230 determines that the number of the changed set of files is less than file change threshold level 228, then increment layer calculator 230 generates new increment file layer 3-1 244 in new upgraded container image version V1.1 246 and copies the set of changed files into new increment file layer 3-1 244. It should be noted that new upgraded container image version V1.1 246 also includes original layer 1 220, original layer 2 222, original layer 3 224, and original layer 4 226 in addition to new increment file layer 3-1 244. Alternatively, if user 208 is upgrading original container image version V1.0 216 to new upgraded container image version V1.2 250, then increment layer calculator 230 generates new increment file layer 3-2 248 in new upgraded container image version V1.2 250 and copies the set of changed files into new increment file layer 3-2 248.

If, at 242, increment layer calculator 230 determines that the number of the set of changed files is greater than or equal to file change threshold level 228, then increment layer calculator 230 generates new anchor file layer 3 252 in new upgraded container image version 2.0 254 and copies the set of changed files, along with the plurality of original files, into new anchor file layer 3 252. It should be noted that new upgraded container image version 2.0 254 includes original layer 1 220, original layer 2 222, and original layer 4 226 and that new anchor file layer 3 252 replaces original layer 3 224.

At 256, build context 214 pushes or sends only the changed layers, such as new increment file layer 3-1 244, new increment file layer 3-2 248, or new anchor file layer 3 253, to remote image registry 206 for future reference. Further, build context 214 sends unique identifiers that associate new increment file layer 3-1 244 with new upgraded container image version V1.1 246, new increment file layer 3-2 248 with new upgraded container image version V1.2 250, and new anchor file layer 3 253 with new upgraded container image version V2.0 254 for fast lookup in remote image registry 206.

Figure 3:
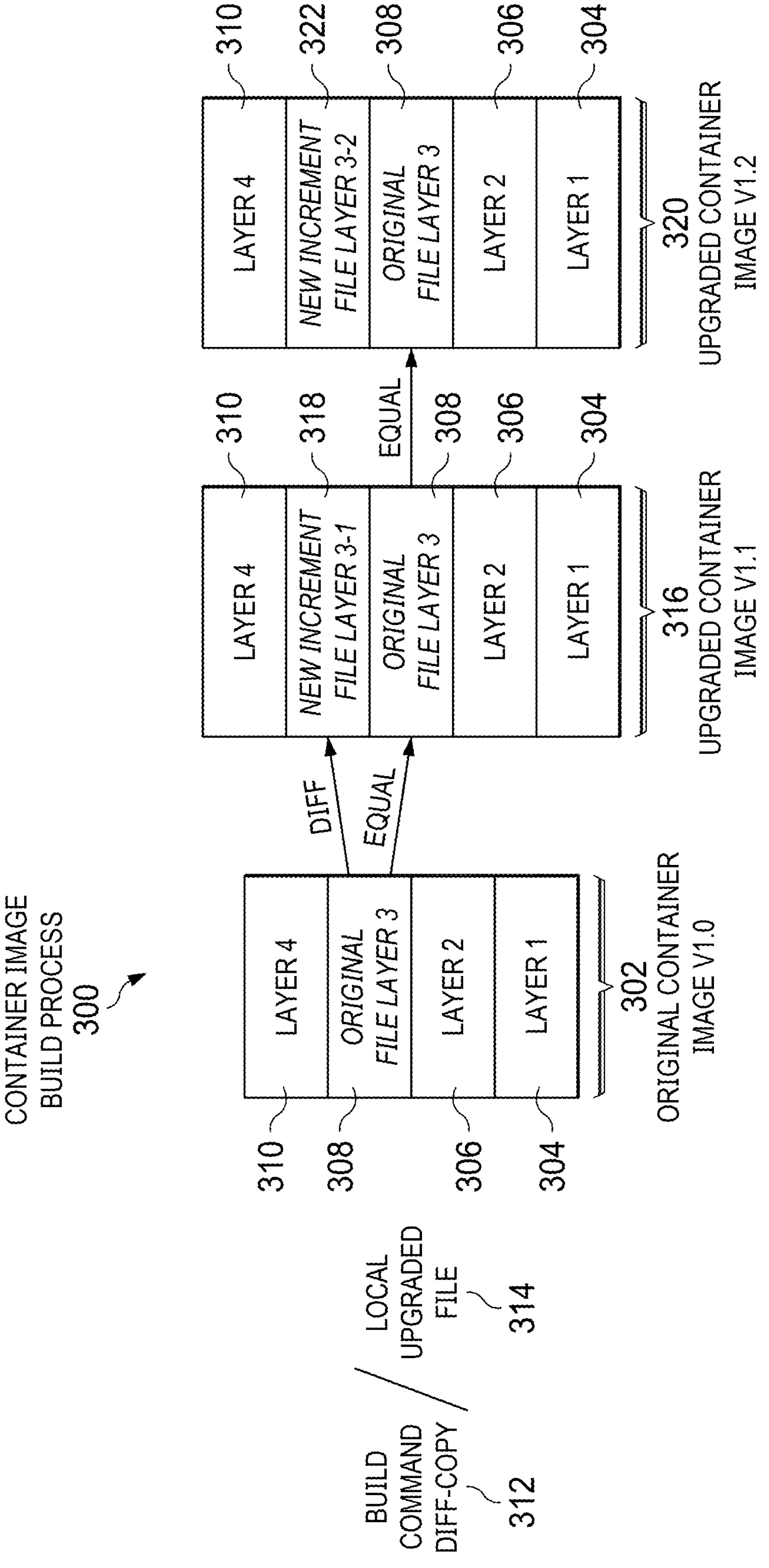
FIG. 3 is a diagram illustrating an example of a container image build process in accordance with an illustrative embodiment.

With reference now to FIG. 3, a diagram illustrating an example of a container image build process is depicted in accordance with an illustrative embodiment. Container image build process 300 can be implemented in a computer, such as computer 101 in FIG. 1 or host node 202 in FIG. 2. For example, container image build process 300 can be implemented by container image management code 200 in FIG. 1.

In this example, container image build process 300 starts with original container image version V1.0 302, which includes layer 1 304, layer 2 306, original file layer 3 308, and layer 4 310. Original container image version V1.0 302 can be, for example, original container image version V1.0 216 in FIG. 2 and layer 1 304, layer 2 306, original file layer 3 308, and layer 4 310 can be, for example, original layer 1 220, original layer 2 222, original layer 3 224, and original layer 4 226 in FIG. 2.

In this example, container image build process 300 receives build command DIFF-COPY 312 from a user to upgrade original container image version V1.0 302 to either upgraded container image version V1.1 316 or upgraded container image version V1.2 320. Build command DIFF-COPY 312 can be, for example, build command 210 in FIG. 2. The user can be, for example, user 208 in FIG. 2. Upgraded container image version V1.1 316 and upgraded container image version V1.2 320 can be, for example, new upgraded container image version V1.1 246 and new upgraded container image version V1.2 250 in FIG. 2.

Container image build process 300 also retrieves local upgraded files 314, such as upgraded files 232 in FIG. 2, from a local file system, such as file system 234 in FIG. 2. Local upgraded files 314 correspond to the plurality of original files in original file layer 3 308 and include a set of changed files for the upgrade of original container image version V1.0 302. Container image build process 300 generates a hash of the plurality of original files in original file layer 3 308 and a hash of local upgraded files 314. Container image build process 300 compares the two hashes to identify the set of changed files in local upgraded files 314.

If the user is upgrading original container image version V1.0 302 to upgraded container image version V1.1 316, then container image build process 300 generates new increment file layer 3-1 318 in upgraded container image version V1.1 316, which also includes layer 1 304, layer 2 306, original file layer 3 308, and layer 4 310. After generating new increment file layer 3-1 318 in upgraded container image version V1.1 316, container image build process 300 copies the set of changed files into new increment file layer 3-1 318.

Alternatively, if the user is upgrading original container image version V1.0 302 to upgraded container image version V1.2 320, then container image build process 300 generates new increment file layer 3-2 322 in upgraded container image version V1.2 320, which also includes layer 1 304, layer 2 306, original file layer 3 308, and layer 4 310. After generating new increment file layer 3-2 322 in upgraded container image version V1.2 320, container image build process 300 copies the set of changed files into new increment file layer 3-2 322.

Figure 4:
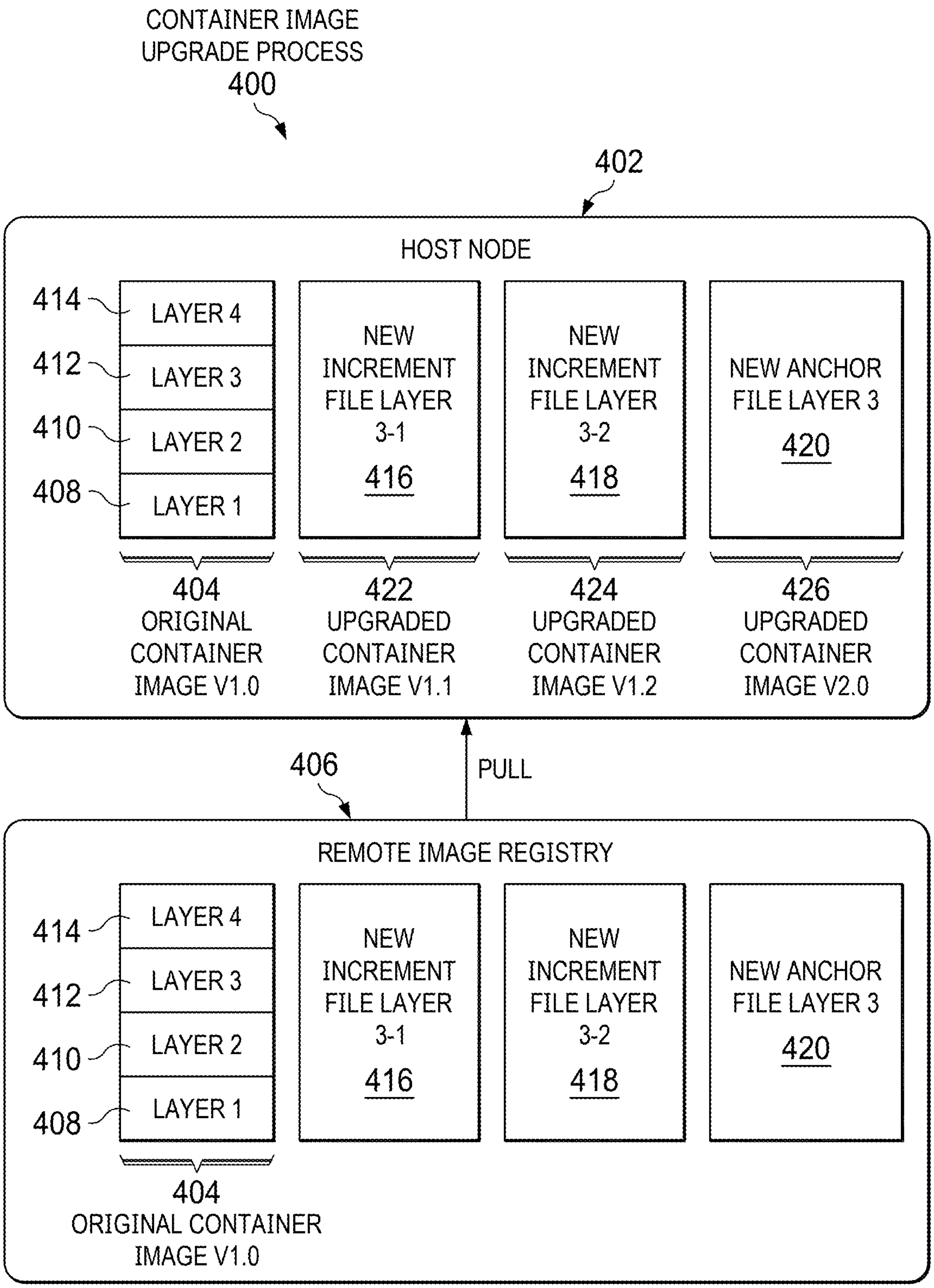
FIG. 4 is a diagram illustrating an example of a container image upgrade process in accordance with an illustrative embodiment.

With reference now to FIG. 4, a diagram illustrating an example of a container image upgrade process is depicted in accordance with an illustrative embodiment. Container image upgrade process 400 is implemented in host node 402, such as host node 202 in FIG. 2. Host node 402 performs container image upgrade process 400 using, for example, container image management code 200 in FIG. 1.

In this example, host node 402 pulls original container image version V1.0 404 from remote image registry 406. Original container image version V1.0 404 is comprised of layer 1 408, layer 2 410, layer 3 412, and layer 4 414. Host node 402 utilizes original container image version V1.0 404 to generate a container to run a microservice on host node 402.

Remote image registry 406 also includes new increment file layer 3-1 416, new increment file layer 3-2 418, and new anchor file layer 3 420. Remote image registry 406 can be, for example, remote image registry 206 in FIG. 2.

In response to host node 402 receiving an input to upgrade original container image version V1.0 404 to upgraded container image version V1.1 422, host node 402 only pulls new increment file layer 3-1 416, which is associated with upgraded container image version V1.1 422 via a unique identifier, from remote image registry 406. In addition, host node 402 stops the microservice running on the container corresponding to original container image version V1.0 404. Afterward, host node 402 adds new increment file layer 3-1 416 to layer 1 408, layer 2 410, layer 3 412, and layer 4 414 to form upgraded container image version V1.1 422. Host node 402 utilizes upgraded container image version V1.1 422 to generate an upgraded container to run the microservice.

In response to host node 402 receiving an input to upgrade original container image version V1.0 404 to upgraded container image version V1.2 424, host node 402 only pulls new increment file layer 3-2 418, which is associated with upgraded container image version V1.2 424 via a unique identifier, from remote image registry 406. In addition, host node 402 stops the microservice running on the container corresponding to original container image version V1.0 404. Afterward, host node 402 adds new increment file layer 3-2 418 to layer 1 408, layer 2 410, layer 3 412, and layer 4 414 to form upgraded container image version V1.2 424. Host node 402 utilizes upgraded container image version V1.2 424 to generate an upgraded container to run the microservice.

In response to host node 402 receiving an input to upgrade original container image version V1.0 404 to upgraded container image version V2.0 426, host node 402 only pulls new anchor file layer 3 420, which is associated with upgraded container image version V2.0 426 via a unique identifier, from remote image registry 406. In addition, host node 402 stops the microservice running on the container corresponding to original container image version V1.0 404. Afterward, host node 402 adds new anchor file layer 3 420, which replaces layer 3 412, to layer 1 408, layer 2 410, and layer 4 414 to form upgraded container image version V2.0 426. Host node 402 utilizes upgraded container image version V2.0 426 to generate an upgraded container to run the microservice.

Figure 5A:
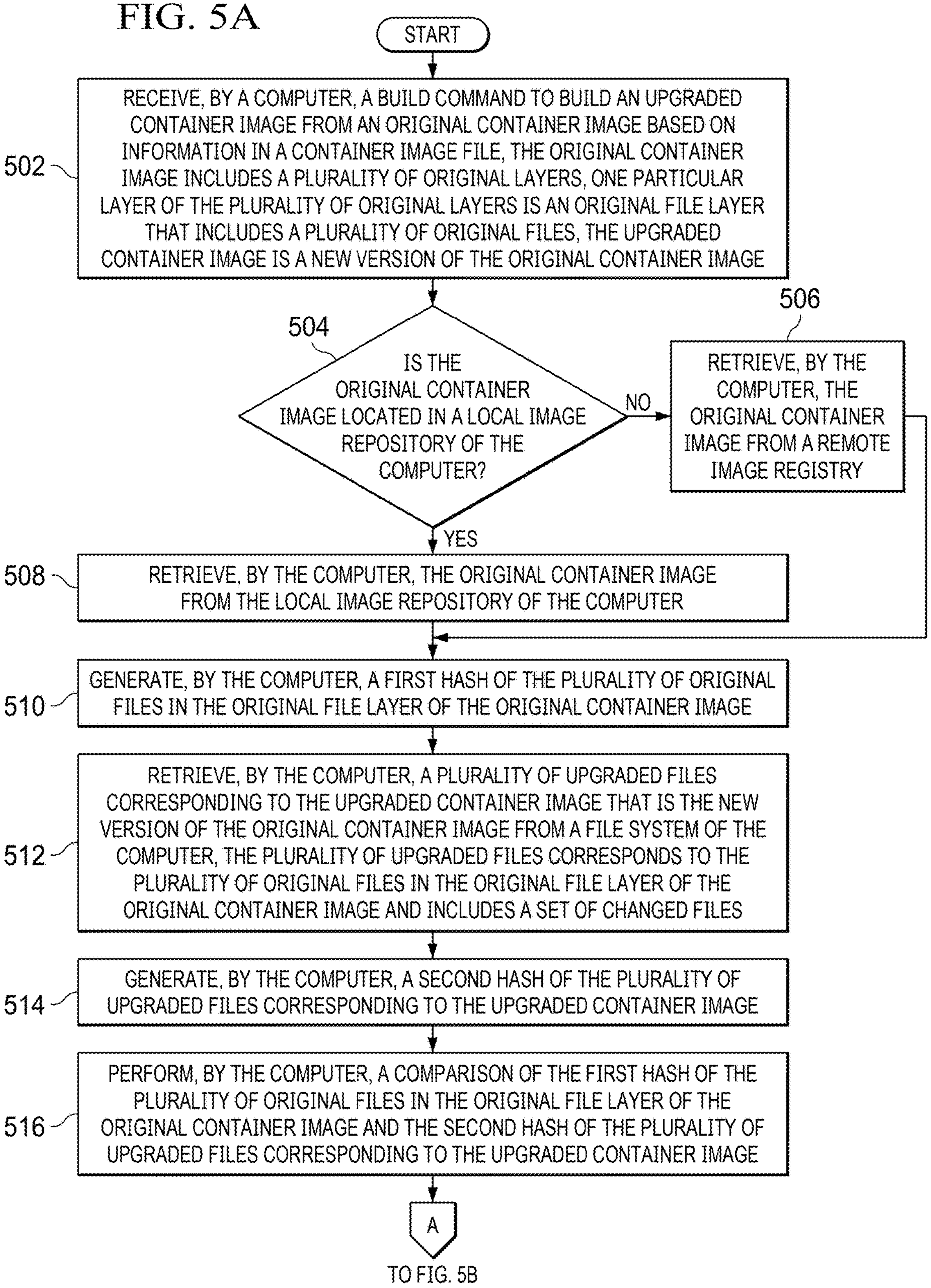
FIGS. 5A-5B are a flowchart illustrating a process for building a container image in accordance with an illustrative embodiment.
Figure 5B:
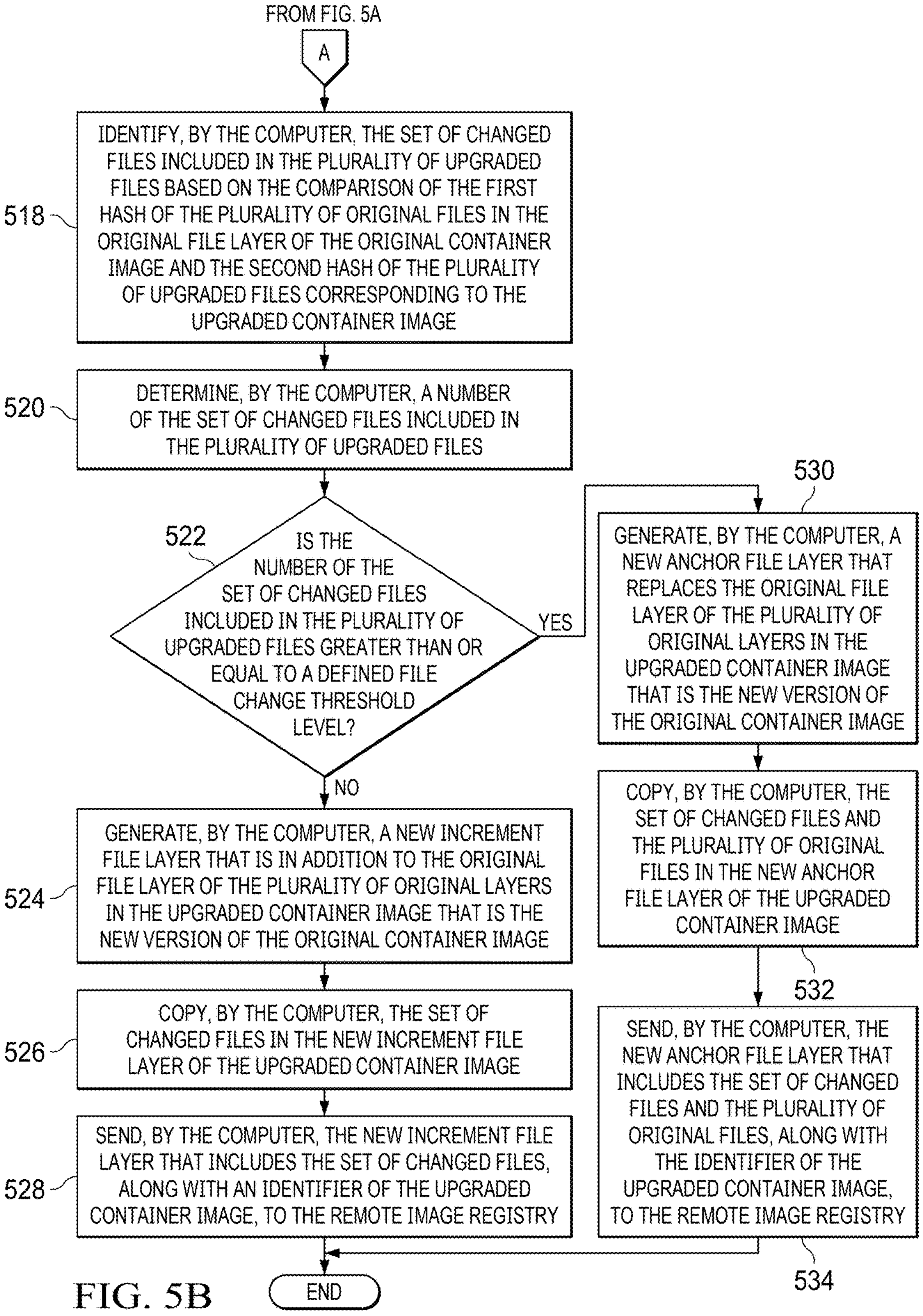

With reference now to FIGS. 5A-5B, a flowchart illustrating a process for building a container image is shown in accordance with an illustrative embodiment. The process shown in FIGS. 5A-5B may be implemented in a computer, such as computer 101 in FIG. 1 or host node 202 in FIG. 2. For example, the process shown in FIGS. 5A-5B may be implemented by container image management code 200 in FIG. 1.

The process begins when the computer receives a build command to build an upgraded container image from an original container image based on information in a container image file (step 502). The original container image includes a plurality of original layers. One particular layer of the plurality of original layers is an original file layer that includes a plurality of original files. The upgraded container image is a new version of the original container image.

The computer makes a determination as to whether the original container image is located in a local image repository of the computer (step 504). If the computer determines that the original container image is not located in the local image repository of the computer, no output of step 504, then the computer retrieves the original container image from a remote image registry (step 506). Thereafter, the process proceeds to step 510. If the computer determines that the original container image is located in the local image repository of the computer, yes output of step 504, then the computer retrieves the original container image from the local image repository of the computer (step 508).

The computer generates a first hash of the plurality of original files in the original file layer of the original container image (step 510). In addition, the computer retrieves a plurality of upgraded files corresponding to the upgraded container image, that is the new version of the original container image, from a file system of the computer (step 512). The plurality of upgraded files corresponds to the plurality of original files in the original file layer of the original container image and includes a set of changed files.

The computer generates a second hash of the plurality of upgraded files corresponding to the upgraded container image (step 514). The computer performs a comparison of the first hash of the plurality of original files in the original file layer of the original container image and the second hash of the plurality of upgraded files corresponding to the upgraded container image (step 516).

The computer identifies the set of changed files included in the plurality of upgraded files based on the comparison of the first hash of the plurality of original files in the original file layer of the original container image and the second hash of the plurality of upgraded files corresponding to the upgraded container image (step 518). Furthermore, the computer determines a number of the set of changed files included in the plurality of upgraded files in response to identifying the set of changed files (step 520). The computer makes a determination as to whether the number of the set of changed files included in the plurality of upgraded files is greater than or equal to a defined file change threshold level (step 522).

If the computer determines that the number of the set of changed files included in the plurality of upgraded files is not greater than or equal to the defined file change threshold level, no output of step 522, then the computer generates a new increment file layer that is in addition to the original file layer of the plurality of original layers in the upgraded container image that is the new version of the original container image (step 524). The computer copies the set of changed files in the new increment file layer of the upgraded container image (step 526). The computer sends the new increment file layer that includes the set of changed files, along with an identifier of the upgraded container image, to the remote image registry (step 528). Thereafter, the process terminates.

Returning again to step 522, if the computer determines that the number of the set of changed files included in the plurality of upgraded files is greater than or equal to the defined file change threshold level, yes output of step 522, then the computer generates a new anchor file layer that replaces the original file layer of the plurality of original layers in the upgraded container image that is the new version of the original container image (step 530). The computer copies the set of changed files and the plurality of original files in the new anchor file layer of the upgraded container image (step 532). The computer sends the new anchor file layer that includes the set of changed files and the plurality of original files, along with the identifier of the upgraded container image, to the remote image registry (step 534). Thereafter, the process terminates.

Figure 6A:
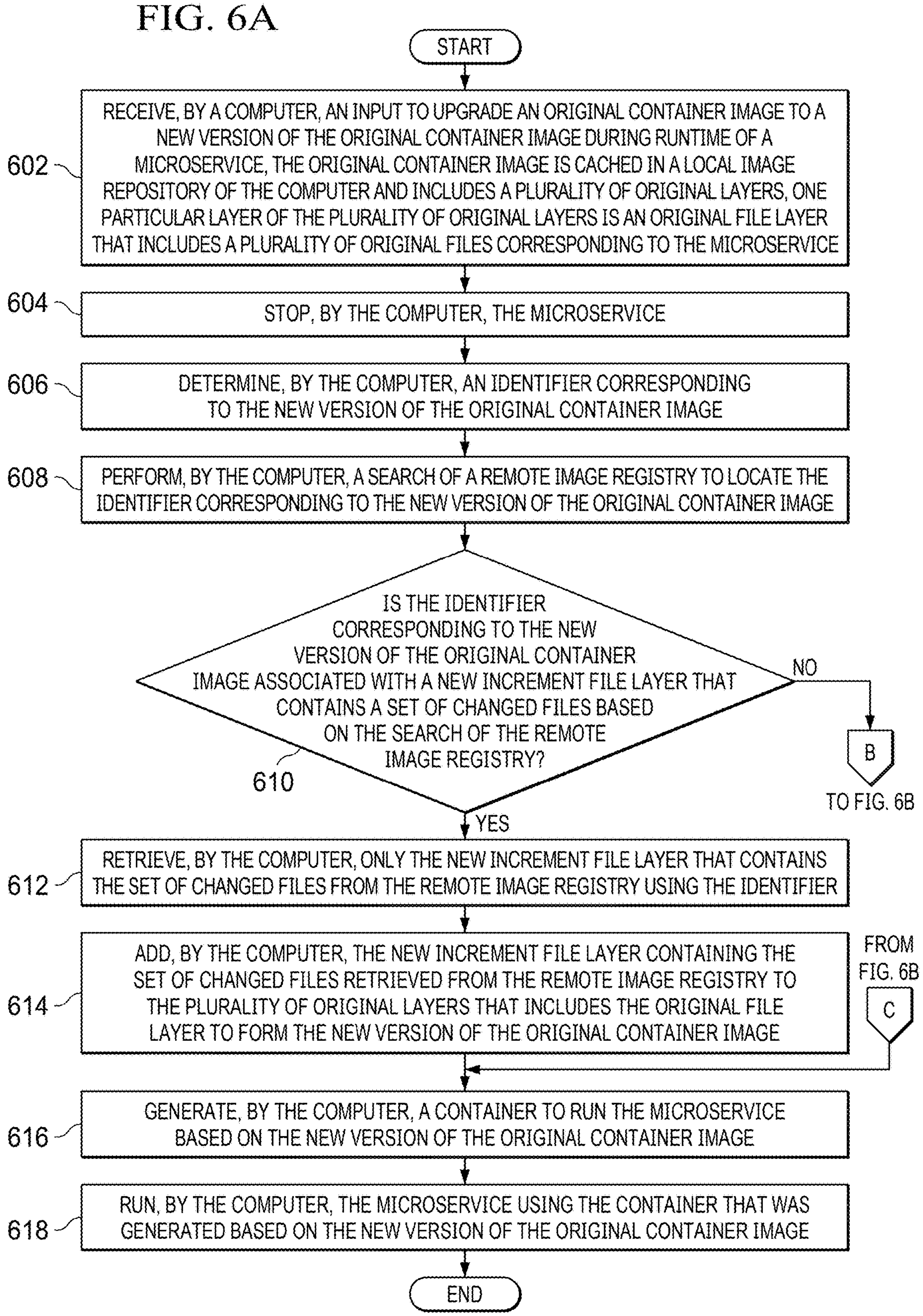
FIGS. 6A-6B are a flowchart illustrating a process for upgrading a container image in accordance with an illustrative embodiment.
Figure 6B:
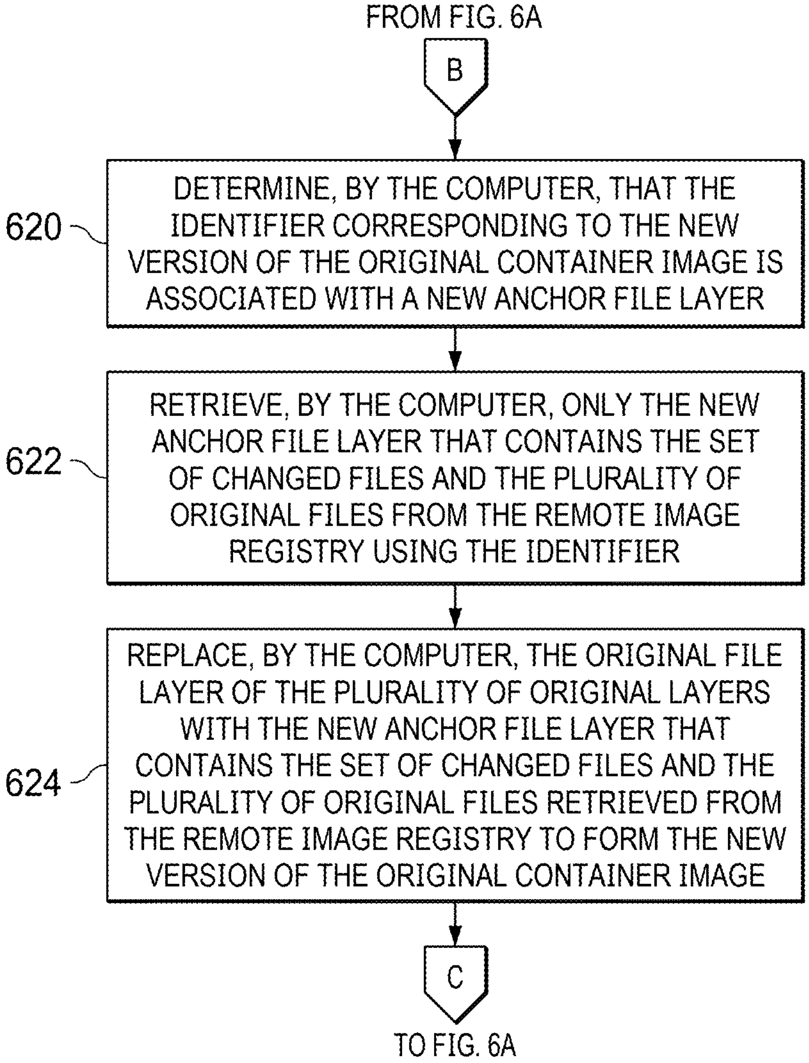

With reference now to FIGS. 6A-6B, a flowchart illustrating a process for upgrading a container image is shown in accordance with an illustrative embodiment. The process shown in FIGS. 6A-6B may be implemented in a computer, such as computer 101 in FIG. 1 or host node 202 in FIG. 2. For example, the process shown in FIGS. 6A-6B may be implemented by container image management code 200 in FIG. 1.

The process begins when the computer receives an input to upgrade an original container image to a new version of the original container image during runtime of a microservice (step 602). The original container image is cached in a local image repository of the computer and includes a plurality of original layers. One particular layer of the plurality of original layers is an original file layer that includes a plurality of original files corresponding to the microservice.

The computer stops the microservice in response to receiving the input to upgrade the original container image to the new version of the original container image (step 604). The computer determines an identifier corresponding to the new version of the original container image (step 606). The computer performs a search of a remote image registry to locate the identifier corresponding to the new version of the original container image (step 608). The computer makes a determination as to whether the identifier corresponding to the new version of the original container image is associated with a new increment file layer that contains a set of changed files based on the search of the remote image registry (step 610).

If the computer determines that the identifier corresponding to the new version of the original container image is associated with the new increment file layer that contains the set of changed files based on the search of the remote image registry, yes output of step 610, then the computer retrieves only the new increment file layer that contains the set of changed files from the remote image registry using the identifier (step 612). The computer adds the new increment file layer containing the set of changed files retrieved from the remote image registry to the plurality of original layers that includes the original file layer to form the new version of the original container image (step 614). The computer generates a container to run the microservice based on the new version of the original container image (step 616). The computer runs the microservice using the container that was generated based on the new version of the original container image (step 618). Thereafter, the process terminates.

Returning again to step 610, if the computer determines that the identifier corresponding to the new version of the original container image is not associated with a new increment file layer that contains the set of changed files based on the search of the remote image registry, no output of step 610, then the computer determines that the identifier corresponding to the new version of the original container image is associated with a new anchor file layer (step 620). The computer retrieves only the new anchor file layer that contains the set of changed files and the plurality of original files from the remote image registry using the identifier (step 622). The computer replaces the original file layer of the plurality of original layers with the new anchor file layer that contains the set of changed files and the plurality of original files retrieved from the remote image registry to form the new version of the original container image (step 624). Thereafter, the process returns to step 616 where the computer generates the container to run the microservice based on the new version of the original container image.

Thus, illustrative embodiments of the present disclosure provide a computer-implemented method, computer system, and computer program product for managing container images. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing container images, the computer-implemented method comprising:

determining, by a computer, a number of a set of changed files included in a plurality of upgraded files in response to identifying the set of changed files;

determining, by the computer, whether the number of the set of changed files included in the plurality of upgraded files is greater than a defined file change threshold level;

responsive to the computer determining that the number of the set of changed files included in the plurality of upgraded files is not greater than the defined file change threshold level, generating, by the computer, a new increment file layer that is in addition to an original file layer of a plurality of original layers in an upgraded container image of an original container image;

copying, by the computer, the set of changed files in the new increment file layer of the upgraded container image;

receiving, by the computer, an input to upgrade the original container image to a new version of the original container image;

determining, by the computer, an identifier corresponding to the new version of the original container image;

responsive to the computer determining that the identifier corresponding to the new version of the original container image is not associated with the new increment file layer that contains the set of changed files based on a search of a remote image registry, determining, by the computer, that the identifier corresponding to the new version of the original container image is associated with a new anchor file layer;

retrieving, by the computer, the new anchor file layer that contains the set of changed files and a plurality of original files from the remote image registry using the identifier; and replacing, by the computer, the original file layer of the plurality of original layers with the new anchor file layer that contains the set of changed files and the plurality of original files retrieved from the remote image registry to form the new version of the original container image.

2. The computer-implemented method of claim 1, further comprising:

responsive to the computer determining that the number of the set of changed files included in the plurality of upgraded files is greater than the defined file change threshold level, generating, by the computer, the new anchor file layer that replaces the original file layer of the plurality of original layers in the upgraded container image of the original container image; and copying, by the computer, the set of changed files and the plurality of original files in the new anchor file layer of the upgraded container image.

3. The computer-implemented method of claim 1, further comprising:

performing, by the computer, a comparison of a first hash of the plurality of original files in the original file layer of the original container image and a second hash of the plurality of upgraded files corresponding to the upgraded container image; and identifying, by the computer, the set of changed files included in the plurality of upgraded files based on the comparison of the first hash of the plurality of original files in the original file layer of the original container image and the second hash of the plurality of upgraded files corresponding to the upgraded container image.

4. The computer-implemented method of claim 1, further comprising:

generating, by the computer, a first hash of the plurality of original files in the original file layer of the original container image; and generating, by the computer, a second hash of the plurality of upgraded files corresponding to the upgraded container image.

5. The computer-implemented method of claim 1, further comprising:

stopping, by the computer, a microservice in response to receiving the input to upgrade the original container image to the new version of the original container image;

performing, by the computer, the search of the remote image registry to locate the identifier corresponding to the new version of the original container image; and determining, by the computer, whether the identifier corresponding to the new version of the original container image is associated with the new increment file layer that contains the set of changed files based on the search of the remote image registry.

6. The computer-implemented method of claim 5, further comprising:

responsive to the computer determining that the identifier corresponding to the new version of the original container image is associated with the new increment file layer that contains the set of changed files based on the search of the remote image registry, retrieving, by the computer, only the new increment file layer that contains the set of changed files from the remote image registry using the identifier; and adding, by the computer, the new increment file layer containing the set of changed files retrieved from the remote image registry to the plurality of original layers that includes the original file layer to form the new version of the original container image.

7. The computer-implemented method of claim 5, further comprising:

generating, by the computer, a container to run the microservice based on the new version of the original container image; and running, by the computer, the microservice using the container that was generated based on the new version of the original container image.

8. A computer system for managing container images, the computer system comprising:

a communication fabric;

a set of computer-readable storage media connected to the communication fabric, wherein the set of computer-readable storage media collectively stores program instructions; and a set of processors connected to the communication fabric, wherein the set of processors executes the program instructions to:

determine a number of a set of changed files included in a plurality of upgraded files in response to identifying the set of changed files;

determine whether the number of the set of changed files included in the plurality of upgraded files is greater than a defined file change threshold level;

generate a new increment file layer that is in addition to an original file layer of a plurality of original layers in an upgraded container image of an original container image in response to determining that the number of the set of changed files included in the plurality of upgraded files is not greater than the defined file change threshold level;

copy the set of changed files in the new increment file layer of the upgraded container image;

receive an input to upgrade the original container image to a new version of the original container image;

determine an identifier corresponding to the new version of the original container image;

determine that the identifier corresponding to the new version of the original container image is associated with a new anchor file layer in response to determining that the identifier corresponding to the new version of the original container image is not associated with the new increment file layer that contains the set of changed files based on a search of a remote image registry;

retrieve the new anchor file layer that contains the set of changed files and a plurality of original files from the remote image registry using the identifier; and replace the original file layer of the plurality of original layers with the new anchor file layer that contains the set of changed files and the plurality of original files retrieved from the remote image registry to form the new version of the original container image.

9. The computer system of claim 8, wherein the set of processors further executes the program instructions to:

generate the new anchor file layer that replaces the original file layer of the plurality of original layers in the upgraded container image of the original container image in response to determining that the number of the set of changed files included in the plurality of upgraded files is greater than the defined file change threshold level; and copy the set of changed files and the plurality of original files in the new anchor file layer of the upgraded container image.

10. The computer system of claim 8, wherein the set of processors further executes the program instructions to:

perform a comparison of a first hash of the plurality of original files in the original file layer of the original container image and a second hash of the plurality of upgraded files corresponding to the upgraded container image; and identify the set of changed files included in the plurality of upgraded files based on the comparison of the first hash of the plurality of original files in the original file layer of the original container image and the second hash of the plurality of upgraded files corresponding to the upgraded container image.

11. The computer system of claim 8, wherein the set of processors further executes the program instructions to:

generate a first hash of the plurality of original files in the original file layer of the original container image; and generate a second hash of the plurality of upgraded files corresponding to the upgraded container image.

12. A computer program product for managing container images, the computer program product comprising a set of computer-readable storage media having program instructions collectively stored therein, the program instructions executable by a computer to cause the computer to:

determine a number of a set of changed files included in a plurality of upgraded files in response to identifying the set of changed files;

determine whether the number of the set of changed files included in the plurality of upgraded files is greater than a defined file change threshold level;

generate a new increment file layer that is in addition to an original file layer of a plurality of original layers in an upgraded container image of an original container image in response to determining that the number of the set of changed files included in the plurality of upgraded files is not greater than the defined file change threshold level;

copy the set of changed files in the new increment file layer of the upgraded container image;

receive an input to upgrade the original container image to a new version of the original container image;

determine an identifier corresponding to the new version of the original container image;

determine that the identifier corresponding to the new version of the original container image is associated with a new anchor file layer in response to determining that the identifier corresponding to the new version of the original container image is not associated with the new increment file layer that contains the set of changed files based on a search of a remote image registry;

retrieve the new anchor file layer that contains the set of changed files and a plurality of original files from the remote image registry using the identifier; and replace the original file layer of the plurality of original layers with the new anchor file layer that contains the set of changed files and the plurality of original files retrieved from the remote image registry to form the new version of the original container image.

13. The computer program product of claim 12, wherein the program instructions further cause the computer to:

generate the new anchor file layer that replaces the original file layer of the plurality of original layers in the upgraded container image of the original container image in response to determining that the number of the set of changed files included in the plurality of upgraded files is greater than the defined file change threshold level; and copy the set of changed files and the plurality of original files in the new anchor file layer of the upgraded container image.

14. The computer program product of claim 12, wherein the program instructions further cause the computer to:

perform a comparison of a first hash of the plurality of original files in the original file layer of the original container image and a second hash of the plurality of upgraded files corresponding to the upgraded container image; and identify the set of changed files included in the plurality of upgraded files based on the comparison of the first hash of the plurality of original files in the original file layer of the original container image and the second hash of the plurality of upgraded files corresponding to the upgraded container image.

15. The computer program product of claim 12, wherein the program instructions further cause the computer to:

generate a first hash of the plurality of original files in the original file layer of the original container image; and generate a second hash of the plurality of upgraded files corresponding to the upgraded container image.

16. The computer program product of claim 12, wherein the program instructions further cause the computer to:

stop a microservice in response to receiving the input to upgrade the original container image to the new version of the original container image;

perform the search of the remote image registry to locate the identifier corresponding to the new version of the original container image; and determine whether the identifier corresponding to the new version of the original container image is associated with the new increment file layer that contains the set of changed files based on the search of the remote image registry.

17. The computer program product of claim 16, wherein the program instructions further cause the computer to:

retrieve only the new increment file layer that contains the set of changed files from the remote image registry using the identifier in response to determining that the identifier corresponding to the new version of the original container image is associated with the new increment file layer that contains the set of changed files based on the search of the remote image registry; and add the new increment file layer containing the set of changed files retrieved from the remote image registry to the plurality of original layers that includes the original file layer to form the new version of the original container image.

18. The computer program product of claim 16, wherein the program instructions further cause the computer to:

generate a container to run the microservice based on the new version of the original container image; and run the microservice using the container that was generated based on the new version of the original container image.

* * * * *